United States Patent Office 3,700,629
Patented Oct. 24, 1972

3,700,629
PHOSPHONITRILE ELASTOMERS
Kennard A. Reynard, Mentor, and Selwyn H. Rose, Beachwood, Ohio, assignors to Horizons Incorporated, a division of Horizons Research Incorporated
No Drawing. Filed Mar. 26, 1971, Ser. No. 128,496
Int. Cl. C08g 33/16
U.S. Cl. 260—47 P                  10 Claims

ABSTRACT OF THE DISCLOSURE

Copolymers were prepared which contained the random repeat units

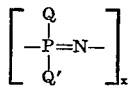

in which Q is either $F(CF_2)_pCH_2O-$ or $H(CF_2)_pCH_2O-$ and B is either $RC_6H_4O$ or $RZC_6H_4O$. The value of $p$ is not greater than 9; Z is $-CH_2-$, oxygen, NH or NR' and R and R' are $H(CH_2)_q-$, or $F(CF_2)_q-$ where $q$ is 0 to 5. These copolymers were found to be much more stable than the poly(phosphazenes) reported in the past.

This invention relates to copolymers of increased thermal stability which contain repeating

units in the polymer chain.

The preparation of related copolymers and terpolymers is described in U.S. Pat. No. 3,515,688 issued June 2, 1970, and in a copending United States application Ser. No. 33,871 filed May 1, 1970. The poly(phosphazenes) therein described are high molecular weight, elastomeric, chemically resistant copolymers or terpolymers with relatively low glass transition temperatures. The disclosures of these specifications are incorporated herein by reference. The copolymers and terpolymers disclosed in these specifications are thermally stable to temperatures up to about 300° C. on a thermobalance.

Homopolymers of poly(phosphazenes) have been described, for example, in Inorg. Chem. 5, 1709 (1966) and in U.S. Pat. No. 3,370,020 issued Feb. 20, 1968. These homopolymers are dissolved by common organic solvents, attacked by mild chemical reagents such as dilute acids and depolymerize at or below 150° C. These known homopolymers include $[(C_6H_5O)_2PN]_x$ and $[(CF_3CH_2O)_2PN]_n$.

We have found that when copolymers containing randomly repeating units

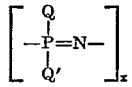

in the polymer are prepared, the copolymers have unexpectedly superior high temperature stability provided Q and Q' are suitably selected. As in U.S. Pat. No. 3,515,-688, substituent Q is either $F(CF_2)_pCH_2O-$ or $H(CF_2)_pCH_2O-$ Substituent Q' is either $RC_6H_4O-$ or $RZC_6H_4O-$ instead of being a fluoroalkoxy radical different from Q as in U.S. Pat. No. 3,515,688. The value of $p$ is not greater than 9, Z is oxygen, $CH_2$, NH or NR' and R and R' are $H(CH_2)_q-$ or $F(CF_2)_q-$, where $q$ is 0 to 5.

These polymers contain the randomly distributed units of the type

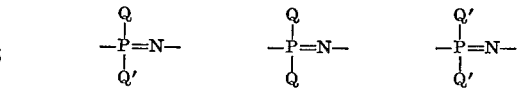

and the ratio of Q:Q' is between 1:9 and 3:1. These copolymers are elastomers or plastics and are stable to over 400° C. when measured on a thermobalance. This improved thermal stability makes these materials highly useful as seals, gaskets, adhesives, coatings and the like at temperatures where other phosphazene polymers are not stable.

Some beneficial effects are obtained with as little as ten percent of Q type sidechains with the effects decreasing above 50 percent.

While we do not wish to be bound by any specific theoretical explanation, it appears that the improved stability results from the following factors. Substituents of type Q' are more electron withdrawing than substituents of type Q. This electron withdrawing effect tends to stabilize the PN backbone and depolymerization is retarded. However, substituents of type Q' are also quite bulky resulting in considerable steric strain which causes the polymers to depolymerize at lower temperatures. The presence of small amounts of substituents of type Q tend to relieve this steric strain with retention of the stabilization effect of type Q' substituents. This relief of steric strain coupled with the high electron withdrawing effect results in copolymers considerably more thermally stable than either homopolymer, and more thermally stable than fluoroalkoxy copolymers of the type described in U.S. Pat. No. 3,515,688.

The copolymers of the present invention are prepared by reacting a mixture of at least two different alkali metal salts, namely an alkali metal salt of a fluoroalkoxide and an alkali metal salt of an aryloxide with linear soluble $[PNCl_2]_x$ polymer. For example, a benzene solution of the linear soluble $[PNCl_2]_x$ polymer was added to an excess equimolar mixture of the sodium salts of the alcohols of Q and Q' in tetrahydrofuran and reacted under suitable conditions. A copolymer corresponding to

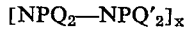

resulted. These copolymers are colorless, linear, high molecular weight materials and are completely substituted. They usually have low glass transition points and are usually thermally stable to over 400° C. as measured on a thermobalance.

The solubilities of these copolymers vary widely with the nature of the Q and Q' groups. Some materials are soluble in most common organic solvents while other copolymers are soluble only in certain fluorocarbon solvents.

The invention is illustrated by the following examples, which are not intended to limit the invention.

EXAMPLE 1

(a) Preparation of poly(dichlorophosphazene)

The trimer or tetramer or other low polymer of dichlorophosphazene was prepared from $PCl_5$ and $NH_4Cl$ by conventional techniques. The $[PNCl_2]_3$ was recrystallized from hexane with activated charcoal to remove trace impurities. M.P. 112–115° C.

Hexachlorophosphazene was polymerized by conventional techniques under vacuum at 250±0.5° until an appropriate melt viscosity was reached. After the sample cooled, the polymerization tube was broken under a nitrogen atmosphere and the bulk of the polymer added to a flask containing 500 ml. of dry benzene protected by a nitrogen atmosphere. It normally took about 24 hours for all of the linear poly(dichlorophosphazene) to dissolve. The polymer was stored in the absence of moisture and was used promptly since after standing several days the material cross-links to form an insoluble gel.

(b) Preparation of $[NP(OCH_2CF_3)_2-NP(OC_6H_5)_2]_n$ with a substituent ratio of approximately 1:5

The sodium phenoxide (0.52 mole) and sodium trifluoroethoxide (0.52 mole) were prepared in 300 ml. of dry diglyme by the addition of the alcohols to sodium (0.95 mole). When reaction was complete the solution was heated to 125° C. and 50 g. of the $[PNCl_2]_x$ polymer mixture dissolved in about 275 ml. benzene was added dropwise. The reaction temperature slowly fell to 101° C. Reflux was continued for several hours after addition was complete. Then the mixture was cooled and hydrolyzed with dilute acid. The organic layer was treated with 3 liters isopropanol and the white polymeric precipitate was isolated and dried. The polymer was dissolved in benzene, washed with water and precipitated by addition to petroleum ether. The polymer was redissolved in benzene, washed again with water and precipitated by addition of petroleum ether.

*Analysis.*—Calculated for $$[NP(OCH_2CF_3)_2-NP(OC_6H_5)_2]_n$$

copolymer with substituent ratio of 1:5 (percent): C, 54.9; H, 3.8; N, 6.0; F, 8.2. Found (percent): C, 55.2; H, 4.1; N, 6.2; F, 9.6; Cl, 0.5. This fibrous plastic had an intrinsic viscosity of 3.51 dl./g. in benzene and showed an initial decomposition point by thermogravimetric analysis (TGA) of 460° C.

EXAMPLE 2

Sodium phenoxide was prepared in 50 ml. of dry tetrahydrofuran from phenol (0.062 mole) and sodium (0.059 mole). Sodium trifluoroethoxide was prepared from trifluoroethanol (0.059 mole) and sodium (0.057 mole). The sodium trifluoroethoxide solution was added dropwise to a cooled (0–5° C.) benzene solution of purified poly(dichlorophosphazene) (0.056 mole). The sodium phenoxide solution was then added dropwise. The solution was refluxed overnight, cooled and hydrolyzed with dilute hydrochloric acid. After the reaction mixture was concentrated by evaporation, the polymer was obtained by precipitation into isopropanol.

*Analysis.*—Calculated for $$[NP(OCH_2CF_3)_2-NP(OC_6H_5)_2]_n$$

with a substituent ratio of 1:1 (percent): C, 40.5; H, 3.0; N, 5.9; F, 24.1. Found (percent): C, 39.8; H, 2.9; N, 6.1; F, 22.9; Cl, 0.3. The copolymer is a white elastomer which is soluble in benzene and acetone and had an intrinsic viscosity of 3.26 dl./g. in acetone. The polymer had an initial decomposition point on the thermobalance of about 425° C. in nitrogen.

EXAMPLE 3

Sodium (2.12 moles), trifluoroethanol (1.16 moles) and phenol (1.16 moles) were placed in 150 ml. dry tetrahydrofuran and refluxed until sodium was no longer visible. A benzene solution of purified $[PNCl_2]_x$ (0.65 mole) was added dropwise to the alkoxide mixture at reflux. The reaction mixture was refluxed, hydrolyzed and purified as in Example 1. A colorless elastomer was obtained with similar solubilities to the copolymer prepared in Example 1.

*Analysis.*—Calculated for $$[NP(OCH_2CF_3)_2-NP(OC_6H_5)_2]_n$$

with substituent ratio of 3:1. (percent): C, 30.0; H, 2.3; N, 5.8; F, 35.7. Found (percent): C, 29.3; H, 2.4; N, 5.9; F, 37.5; Cl, 0.1. This copolymer had an intrinsic viscosity of 1.25 dl./g. in acetone and exhibited an initial decomposition point of 375° C. when measured on a thermobalance.

EXAMPLE 4

Sodium phenoxide and sodium heptafluorobutoxide were prepared together in 400 ml. dry tetrahydrofuran from the alcohols (0.415 mole each) and sodium (0.761 mole). A benzene solution of the $[PNCl_2]_x$ polymer mixture (0.346 mole) was added dropwise to the alkoxides which were maintained at reflux. Reflux was continued overnight and the soupy mixture was cooled. After hydrolysis with dilute acid, the mixture was concentrated by evaporation and washed with water. The copolymer was obtained by precipitation into benzene. Twice, the copolymer was dissolved in the azeotrope of acetone and $CCl_2FCClF_2$, and precipitated into benzene. The copolymer had an intrinsic viscosity of 2.2 dl./g. in the azeotrope given above.

*Analysis.*—Calculated for $$[NP(OCH_2C_3F_7)_2-NP(OC_6H_5)_2]_n$$

with a substituent ratio of 7:3 (percent): C, 29.2; H, 1.5; N, 3.7; F, 49.2. Found (percent): C, 28.0; H, 1.8; N, 3.8; F, 48.7; Cl, 0.04. The leathery elastomer had an initial decomposition point of 400° C. when measured on a thermobalance.

EXAMPLE 5

Sodium phenoxide and $NaOCH_2C_5F_{10}CF_2H$ were prepared and reacted in similar fashion and amounts as given in Example 4. After hydrolysis and concentration of the reaction mixture, the copolymer was isolated by precipitation into benzene. The dried material was dissolved in acetone twice and precipitated once into benzene and once into water. The white elastomer had an intrinsic viscosity of 2.16 dl./g. in acetone.

*Analysis.*—Calculated for $$[NP(OCH_2(CF_2)_6H)_2-NP(OC_6H_5)_2]_n$$

with a substituent ratio of 7:3 (percent): C, 28.6; H, 1.3; N, 2.5; F, 56.8. Found (percent): C, 28.2; H, 1.3; N, 2.4; F, 55.5; Cl, 0.05. The initial decomposition point as measured on a thermobalance was 390° C.

EXAMPLES 6–11

| Example | Q | Q' | Q:Q' | |
|---|---|---|---|---|
| 6 | $F(CF_2)_3CH_2O-$ | $C_6H_5O-$ | 3:7 | Plastic TGA 450° C. |
| 7 | $H(CF_2)_6CH_2O-$ | $C_6H_5O-$ | 3:7 | Elastomer TGA 425° C. |
| 8 | $H(CF_2)_6CH_2O-$ | $CH_3OC_6H_4O-$ | 2:1 | Elastomer TGA 375° C. |
| 9 | $F(CF_2)_3CH_2O-$ | $(CH_3)_2NC_6H_4O-$ | 1:1 | Elastomer TGA 400° C. |
| 10 | $F(CF_2)_3CH_2O-$ | $CF_3C_6H_4O-$ | 1:4 | Plastic TGA 465° C. |
| 11 | $H(CF_2)_6CH_2O-$ | $C_2H_5C_6H_4O-$ | 1:1 | Elastomer TGA 400° C. |

We claim:
1. A poly(phosphazene) copolymer consisting essentially of randomly distributed units of the formula

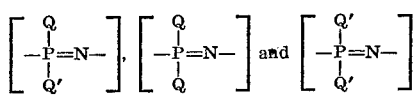

wherein Q represents a monovalent radical selected from the group consisting of $F(CF_2)_pCH_2O-$ and $$H(CF_2)_pCH_2O-$$

and $p$ is an integer from 1 to 9 and wherein Q' represents a monovalent radical selected from the group consisting of $RC_6H_4O-$ and $RZC_6H_4O-$ wherein R is selected from the group consisting of $H(CH_2)_q$ and $$F(CF_2)_q$$

in which $q$ is 0 to 5 and Z represents a divalent member of the group consisting of $-CH_2-$, $-O-$, $-NH-$, and $-NR'-$ wherein R' is a monovalent radical selected from the group consisting of $H(CH_2)_q-$ and $F(CF_2)_q-$ in which $q$ is 0 to 5, and the ratio of A:B is between 1:9 and 3:1.

2. A copolymer of claim 1 wherein Q' is $C_6H_5O-$.
3. A copolymer of claim 2 wherein Q is $CF_3CH_2O-$.
4. A copolymer of claim 2 wherein Q is $$H(CF_2)_6CH_2O-$$

5. A copolymer of claim 2 wherein Q is
$$H(CF_2)_6CH_2O-$$
6. A copolymer of claim 1 wherein Q is $$H(CF_2)_6CH_2O-$$

and Q' is $CH_3OC_6H_4O-$.

7. A copolymer of claim 1 wherein Q is $$F(CF_2)_3CH_2O-$$

and Q' is $(CH_3)_2NC_6H_4O-$.

8. A copolymer of claim 1 wherein Q is $$F(CF_2)_3CH_2O-$$

and Q' is $CF_3C_6H_4O-$.

9. A copolymer of claim 1 wherein Q is $$H(CF_2)_6CH_2O-$$

and Q' is $C_2H_5C_6H_4O-$.

10. A copolymer of claim 1 wherein the ratio of Q:Q' is between 1:4 and 2:1.

References Cited

UNITED STATES PATENTS 3,370,020  2/1968  Allcock et al. _____ 260—2
3,515,688  6/1970  Rose _____ 260—2

WILLIAM H. SHORT, Primary Examiner

L. L. LEE, Assistant Examiner

U.S. Cl. X.R.

260—32.8 N, 33.6 F, 33.8 F